(12) United States Patent
Liu et al.

(10) Patent No.: US 9,264,146 B2
(45) Date of Patent: Feb. 16, 2016

(54) DETECTION AND REMOVAL OF CYCLE SLIP FROM RECEIVED SIGNALS

(71) Applicant: Alcatel Lucent, Paris (FR)

(72) Inventors: Xiang Liu, Marlboro, NJ (US);
Chandrasekhar Sethumadhavan, Matawan, NJ (US); Timo Pfau, Westfield, NJ (US); Giancarlo Gavioli, Arcore (IT)

(73) Assignee: Alcatel Lucent, Boulogne-Billancourt (FR)

( * ) Notice: Subject to any disclaimer, the term of this patent is extended or adjusted under 35 U.S.C. 154(b) by 108 days.

(21) Appl. No.: 14/168,617

(22) Filed: Jan. 30, 2014

(65) Prior Publication Data

US 2015/0215050 A1    Jul. 30, 2015

(51) Int. Cl.
*H04B 10/61* (2013.01)

(52) U.S. Cl.
CPC .................................. *H04B 10/6165* (2013.01)

(58) Field of Classification Search
CPC ........................... H04B 10/6165; H04B 10/612
See application file for complete search history.

(56) References Cited

U.S. PATENT DOCUMENTS

| 7,606,498 | B1* | 10/2009 | Wu et al. ........................ 398/152 |
| 8,095,019 | B2* | 1/2012 | Kaneda et al. ................. 398/208 |
| 8,311,417 | B1* | 11/2012 | Poggiolini et al. ............. 398/208 |
| 2002/0126748 | A1* | 9/2002 | Rafie et al. ...................... 375/229 |
| 2013/0322870 | A1* | 12/2013 | Geyer et al. ...................... 398/25 |

OTHER PUBLICATIONS

Pfau, T., et al., "Hardware-Efficient Coherent Digital Receiver Concept With Feedforward Carrier Recovery for M-QAM Constellations," Journal of Lightwave Technology, 2009, vol. 27, No. 8, pp. 989-999.

Savory, S., "Digital Coherent Optical Receivers: Algorithms and Subsystems," IEEE Journal of Selected Topics in Quantum Electronics, 2010, vol. 16, No. 5, pp. 1164-1179.

* cited by examiner

*Primary Examiner* — Leslie Pascal
(74) *Attorney, Agent, or Firm* — Mendelsohn, Drucker, & Dunleavy, P.C.; Yuri Gruzdkov

(57) ABSTRACT

Embodiments of the disclosure include a method and apparatus for detecting and removing cycle slip. A phase-modulated signal having a plurality of phase-modulated symbols is received at an optical receiver, and, for each phase-modulated symbol, a phase-error estimate of a phase error of the phase-modulated symbol is generated. The presence of a cycle slip is then detected based on the phase-error estimates, and, a phase of each of one or more of the received phase-modulated symbols is adjusted to remove the detected cycle slip without adjusting a local oscillator.

21 Claims, 5 Drawing Sheets

1  Condition_1= sum(abs(p_UW))<1.2*sum(abs(p_W))
2  Condition_2= sum(abs(p_UW-mean(p_UW)))<sum(abs(p_W-mean(p_W))) &
       sum(abs(p_UW))<1.5*sum(abs(p_W));
3
4  if Condition_1 | Condition_2
5      phase_selected=p_UW;
6  else
7      phase_selected=p_W;
8  end

FIG. 2

```
1   dn_pilots2=dn_pilots/2;  % example: dn_pilots2=50
2   for n=n1:n2
3       mean_now=mean(p_VV(n*dn_pilots2+1:(n+1)*dn_pilots2));% current 50
4       mean_past2=mean(p_VV((n-4)*dn_pilots2+1:n*dn_pilots2));% last 200
5       if mean_now-mean_past2>pi/4*1.1 && mean_now>pi/4*0.6
6           p_VV(n*dn_pilots2+1:(n+1)*dn_pilots2)=p_VV(n*dn_pilots2+1:(n+1)*dn_pilots2)-pi/2;
7           % 'a pi/2-jump block found'
8       elseif mean_now-mean_past2<-pi/4*1.1 && mean_now<-pi/4*0.6
9           p_VV(n*dn_pilots2+1:(n+1)*dn_pilots2)=p_VV(n*dn_pilots2+1:(n+1)*dn_pilots2)+pi/2;
10          % 'a -pi/2-jump block found'
11      end
12  end
```

FIG. 3

DETECTION AND REMOVAL OF CYCLE SLIP FROM RECEIVED SIGNALS

BACKGROUND

1. Technical Field

The disclosure relates to signal communications, and, more specifically but not exclusively, to correcting phase errors in signal communications.

2. Description of the Related Art

This section introduces aspects that may be helpful to facilitating a better understanding of the invention(s). Accordingly, the statements of this section are to be read in this light and are not to be understood as admissions about what is in the prior art or what is not in the prior art.

In conventional coherent communications systems, the phase of the receiver's local oscillator might not match the phase of the transmitter's local oscillator. If this phase mismatch is not corrected at the receiver, then the receiver might not properly recover data transmitted from the transmitter to the receiver. One method of correcting this phase mismatch is to adjust the receiver's local oscillator such that the phase of the receiver's local oscillator closely or exactly matches that of the transmitter's local oscillator. Such phase match can be accomplished using a phase-locked loop. However, in some systems such as optical systems, phase-locked loops can be complicated, expensive, and unreliable.

Rather than using a phase-locked loop to correct the phase mismatch, digital signal processing can be used downstream of the receiver's local oscillator to estimate and correct phase errors of complex symbols carried in the received signal without adjusting the phase of the receiver's local oscillator. Such digital processing may include both (i) coarse phase-error estimation and (ii) fine phase-error estimation.

In general, coarse phase-error estimation may be performed by estimating the phase errors of pilot symbols that are intermittently embedded in the received signal by the transmitter. The expected phases of the pilot symbols are known a priori by the receiver, and the receiver uses this knowledge to estimate the phase errors of the pilot symbols. The estimated phase errors of the pilot symbols are further used to estimate phase errors of complex data symbols transmitted between the pilot symbols. Techniques for performing the pilot-aided coarse phase-error estimation are known and therefore are not described herein.

The use of pilot symbols in coarse phase-error estimation does not account for phase wandering that exists in-between the intermittent pilot symbols (i.e., among the data symbols). Therefore, fine phase-error estimation may be performed to improve the phase-error estimates of the data symbols between the pilot symbols. One method for performing fine phase-error estimation, known as a blind phase search, is described in Pfau et al., "Hardware-Efficient Coherent Digital Receiver Concept with Feedforward Carrier Recovery for M-QAM Constellations," Journal of Lightwave Technology, Vol. 27, No. 8, pp. 989-999 (Apr. 15, 2009), the teachings of all of which are herein incorporated by reference in their entirety. Another method for performing fine phase-error estimation, known as the Viterbi and Viterbi algorithm is described in Savory, "Digital Coherent Optical Receivers: Algorithms and Subsystems," IEEE Journal of Selected Topics in Quantum Electronics, Vol. 16, No. 5, pp. 1164-1179 (September-October 2010), the teachings of all of which are incorporated herein by reference in their entirety.

After compensating for coarse and fine phase errors, there may be some relatively small residual phase errors in the compensated complex symbols that cause relatively insignificant degradation in the recovered signal quality. In addition to these residual phase errors, there is a possibility of a cycle slip, which may be more detrimental than the small residual phase errors. A cycle slip occurs when a stream of adjacent complex symbols are in error such that each complex symbol in the stream falls into a quadrant (in the case of QPSK and QAM) of the modulation constellation that is different from the quadrant used to generate the complex symbol. If the stream of errors is relatively long, then the errors might not be correctable using forward-error correction which usually has a limited burst-error correction capability.

SUMMARY

Embodiments of the disclosure include a method and apparatus for detecting and removing cycle slip. A phase-modulated signal having a plurality of phase-modulated symbols is received at an optical receiver, and, for each phase-modulated symbol, a phase-error estimate of a phase error of the phase-modulated symbol is generated. The presence of a cycle slip is then detected based on the phase-error estimates, and, a phase of each of one or more of the received phase-modulated symbols is adjusted to remove the detected cycle slip without adjusting a local oscillator.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 2 shows Matlab code that may be used by the conditional phase-unwrapping block in FIG. 1 according to one embodiment of the disclosure;

FIG. 3 shows Matlab code that may be used by the cycle slip detection and removal block in FIG. 1 according to one embodiment of the disclosure;

DETAILED DESCRIPTION

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

In systems that use digital signal processing (e.g., coarse phase-error estimation and/or fine phase-error estimation) to correct phase errors at a location downstream of a receiver's local oscillator, cycle slips may be avoided using differential modulation and demodulation. However, differential modulation and demodulation increases the bit-error rate of the communications system. Rather than avoiding cycle slip using differential modulation and demodulation, the inventors have discovered that cycle slip can be both detected and corrected in a digital signal using digital signal processing that is implemented downstream of a local oscillator. Since the correction is performed downstream of the local oscillator, cycle slip may be corrected without the aid of a phase-locked loop and without adjusting the local oscillator. Thus, system complexity is avoided that would otherwise result from adjusting the local oscillator.

Figure 1:
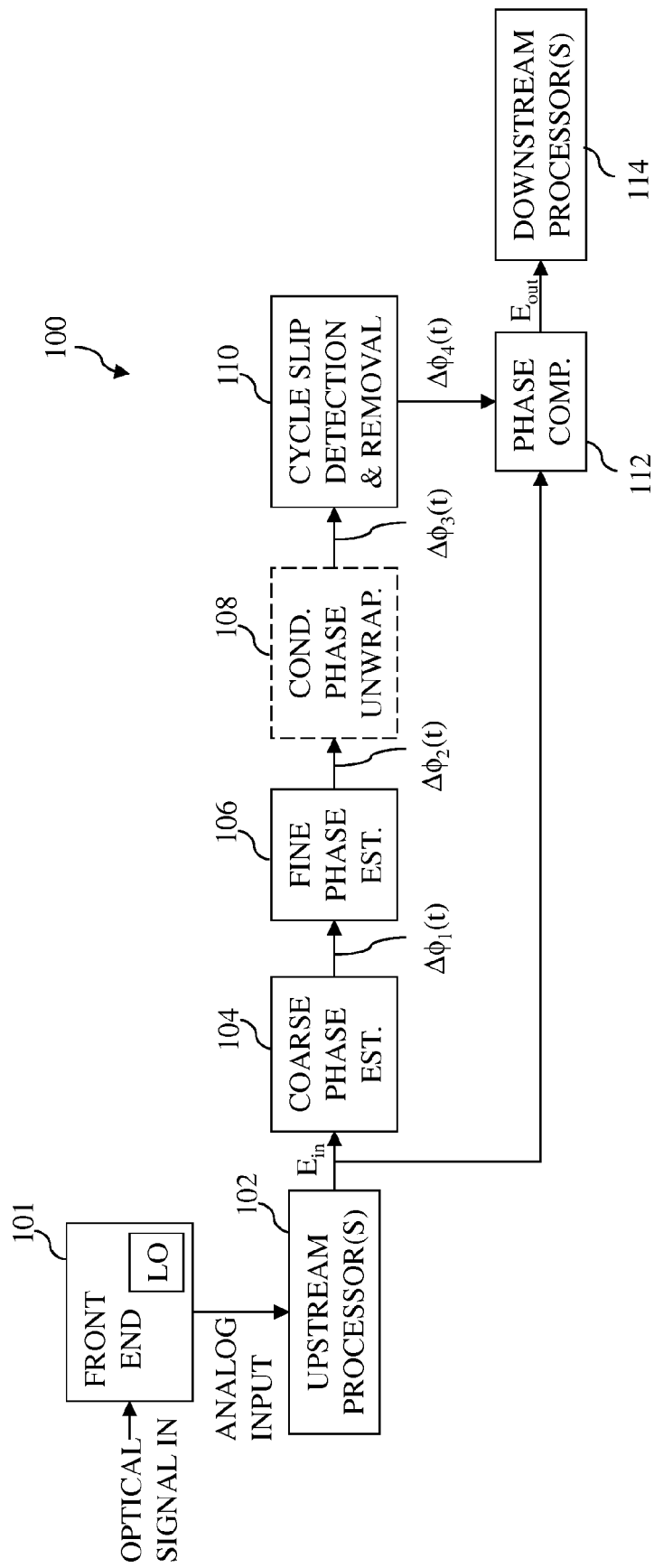
FIG. 1 shows a simplified block diagram of a receiver according to one embodiment of the disclosure that employs cyclic slip detection and removal.

FIG. 1 shows a simplified block diagram of a receiver 100 according to one embodiment of the disclosure that employs cyclic slip detection and removal. Receiver 100 receives an optical signal from a transmitter (not shown) over a transmission medium such as (without limitation) a fiber optical link or a free-space link. The optical signal is processed by front end 101, which may include processing such as (without limitation) an optical-to-electrical converter and a local oscillator (LO).

Front end 101 provides an analog signal to one or more upstream processors 102, which perform processing such as (without limitation) analog-to-digital conversion, electronic dispersion compensation, timing recovery, polarization de-multiplexing and channel equalization to generate an electronic digital signal $E_{in}$. The particular processing performed by the one or more upstream processors 102 may depend on, among other things, the transmission medium over which the analog signal is transmitted. As used herein, "upstream" and "downstream" refer to positions along the receiver 100 datapath relative to particular processing on the datapath, with upstream characterizing a position (or positions) on the datapath that is before the particular processing, and downstream characterizing a position (or positions) on the datapath that is after the particular processing. For example, upstream processors 102 refer to processors that are positioned before, and are therefore upstream of, elements 104-112, while downstream processors 114 refer to processors that are positioned after, and are therefore downstream of, elements 104-112.

Digital signal $E_{in}$ comprises a plurality of complex phase-modulated symbols, some of which contain data (payload) information and others that contain pilot information. Each complex symbol is modulated at the transmitter before transmission to receiver 100 using a suitable phase-modulation technique, such as (without limitation) binary phase-shift keying (BPSK), quadrature phase-shift keying (QPSK), or quadrature amplitude modulation (QAM). Further, each complex pilot symbol may be separated from each adjacent complex pilot symbol by a number N (e.g., 100) of complex data symbols.

Coarse phase estimator 104 performs coarse phase-error estimation on the digital signal $E_{in}$ to generate an estimate of the phase error of each complex pilot symbol. The estimated phase errors of the complex pilot symbols are further used to estimate a phase error of each complex data symbol between consecutive complex pilot symbols. As a result, coarse phase estimator 104 generates a stream of coarse phase-error estimates $\Delta\phi_1(t)$ over time t, where each coarse phase-error estimate corresponds to a different complex phase-modulated symbol of digital signal $E_{in}$.

Fine phase estimator 106 performs fine phase-error estimation to improve the phase-error estimates for the data symbols, resulting in stream of possibly-improved fine phase-error estimates $\Delta\phi_2(t)$, where each fine phase-error estimate corresponds to a different complex phase-modulated symbol of digital signal $E_{in}$. Fine phase-error estimation may be performed using any suitable technique, including (without limitation) a blind phase search or the Viterbi and Viterbi algorithm discussed above.

The fine phase-error estimates $\Delta\phi_2(t)$ generated by fine phase estimator 106 are bounded within a pre-determined range. For example, for modulation schemes that have four quadrants such as QPSK and 16-QAM, and where the phase errors should be less than $\pi/2$, the fine phase-error estimates $\Delta\phi_2(t)$ may be normalized about zero and bounded between $-\pi/4$ and $+\pi/4$.

The fine phase-error estimates $\Delta\phi_2(t)$ output from fine phase estimator 106 could contain a sudden jump, wherein the phase-error estimates after the jump are at or near an error value that is significantly different from that of the phase-error estimates before the jump. Note that, as used herein, a "jump" in phase-error estimates refers to a relatively significant and lasting increase or decrease in the phase-error estimates, as opposed to a momentary change or relatively insignificant change. This sudden jump could be the result of phase wrapping, which is the bounding of the fine phase-error estimates $\Delta\phi_2(t)$ (e.g., between $-\pi/4$ and $+\pi/4$). Thus, a phase error slightly greater than $+\pi/4$ will jump to slightly greater than $-\pi/4$, and a phase error slightly less than $-\pi/4$ will jump to slightly less than $+\pi/4$. Such jumps could be indicative of cycle slips.

Optionally, receiver 100 may employ conditional phase-unwrapping block 108 to conditionally unwrap the phase-error estimates. Unwrapping the phase errors removes the bounding. Thus, to continue the examples above, a phase-error estimate slightly greater than $+\pi/4$ will remain slightly greater than $+\pi/4$, rather than jump to slightly greater than $-\pi/4$, and a phase-error estimate slightly less than $-\pi/4$ will remain slightly less than $-\pi/4$, rather than jump to slightly less than $+\pi/4$. If a jump is the result of phase wrapping, then, when the phase-error estimates are unwrapped, the jump should be removed.

FIG. 2 shows Matlab code 200 that may be used by conditional phase-unwrapping block 108 of FIG. 1 according to one embodiment of the disclosure. In general, the wrapped (i.e., bounded) fine phase-error estimates $\Delta\phi_2(t)$ received from fine phase estimator 106 are divided into non-overlapping blocks (e.g., vectors) p_W of wrapped phase-error estimates. Each block contains a plurality (e.g., 100) of consecutive fine phase-error estimates $\Delta\phi_2(t)$. For each block p_W of wrapped phase-error estimates, conditional phase-unwrapping block 108 generates a block p_UW of unwrapped fine phase-error estimates $\Delta\phi_2(t)$ by unwrapping the wrapped phase-error estimates in block p_W. Calculations for unwrapping phase-error estimates (now shown) are well known and therefore not described herein. A description of phase unwrapping may be found in Smith, Julius O., "Introduction to Digital Filters with Audio Applications," W3K Publishing, 2007, incorporated herein by reference in its entirety.

Matlab code 200 analyzes each pair of blocks p_W and p_UW using two conditions to determine whether to select the wrapped phase-error estimates or the unwrapped phase-error estimates. When either condition is met (line 4), conditional phase-unwrapping block 108 outputs the block p_UW of unwrapped phase-error estimates as phase-error estimates $\Delta\phi_3(t)$ (line 5). When a jump is present due to phase wrapping, the unwrapped phase-error estimates where the jump occurs are outside of the bounded range of the wrapped phase errors (i.e., phase-error estimates greater than $+\pi/4$ will be greater than $+\pi/4$, rather than jump to near $-\pi/4$, and phase-error estimates less than $-\pi/4$ will be less than $-\pi/4$, rather than jump to near $+\pi/4$). When neither condition is met (line 6), conditional phase-unwrapping block 108 outputs the block p_W of wrapped phase-error estimates as phase-error estimates $\Delta\phi_3(t)$ (line 7).

In effect, the two conditions are used to prevent the unwrapped phase-error estimates from being used when large phase jumps are caused by noise. Unwrapping the phase-error estimates in such cases may result in an unwanted π/2 jump being introduced.

In line 1, Condition 1 is operates to compare (i) an average of the magnitudes (i.e., absolute values) of the phase-error estimates in the block of unwrapped phase-error estimates p_UW to (ii) a scaled average of the magnitudes of the phase-error estimates in the block of wrapped phase-error estimates p_W. Note, however, that the step of dividing each sum by the number of complex symbols in a block to generate each average is omitted since this number is the same for both sides of the inequality. Further, the scaling factor may be determined empirically and may be determined to be some value other than 1.2.

In lines 2-3, Condition 2 has two comparisons, both of which must be met for Condition 2 to be satisfied. The first comparison (line 2) operates to compare (i) an average variation between (a) the phase-error estimates in the block of unwrapped phase-error estimates p_UW and (b) the mean unwrapped phase-error estimate to (ii) an average variation between (a) the phase-error estimates in the block of wrapped phase-error estimates p_W and (b) the mean wrapped phase-error estimate. The second comparison (line 3) is similar to the comparison in Condition 1. However, a scaling factor (e.g., 1.5) is larger in Condition 2 than in Condition 1. Like the scaling factor in Condition 1, the scaling factor in Condition 2 may be determined empirically.

Referring back to FIG. 1, cycle slip detection and removal block 110 receives the phase-error estimates $\Delta\phi_3(t)$, which might or might not be unwrapped by conditional phase unwrapping block 108, and detects and removes jumps remaining in the phase-error estimates $\Delta\phi_3(t)$. According to some embodiments of the present disclosure, cycle slip detection and removal block 110 can simply look at the phase-error estimates $\Delta\phi_3(t)$ and determine if there is a significant change between two adjacent phase-error estimates $\Delta\phi_3(t)$ (e.g., by comparing the magnitude of the change to a threshold). According to other embodiments of the disclosure, cycle slip detection and removal block 110 can detect a jump by looking at sliding averages of blocks of phase-error estimates $\Delta\phi_3(t)$ (e.g., by comparing a current sliding average to a previous sliding average). According to yet other embodiments of the disclosure, cycle slip detection and removal block 110 can detect a jump by comparing a current block of phase-error estimates $\Delta\phi_3(t)$ to a previous block of phase-error estimates $\Delta\phi_3(t)$. One example of these latter embodiments is shown in FIG. 3.

FIG. 3 shows Matlab code 300 that may be used by cycle slip detection and removal block 110 according to one embodiment of the disclosure to detect a cycle slip. In line 1, a block size (e.g., dn_pilots2) is set. For the purpose of this discussion, it is assumed without limitation that (i) the block size dn_pilots2 is set to half of the distance between consecutive pilot symbols, and (ii) the pilot symbols are spaced apart by 100 data symbols such that the current block size dn_pilots2 is set to 50.

Lines 2-12 are performed for each full block n of the phase-error estimates $\Delta\phi_3(t)$ in a set of blocks beginning with a first block n1 and ending with a last block n2. For each block n (i.e., each current block), a mean (i.e., mean_now) of the phase-error estimates $\Delta\phi_3(t)$ in the block (e.g., the current 50 estimates) is computed in line 3. Note that p_VV represents the phase-error estimates $\Delta\phi_3(t)$ output from conditional phase-unwrapping block 108 or the fine phase-error estimates $\Delta\phi_2(t)$ output from fine phase estimator 106 if conditional phase-unwrapping block 108 is not employed. Further, for each block n, a mean (i.e., mean_past2) of the previous few blocks is computed in line 4. For the purpose of this discussion, it is assumed without limitation that the mean for the previous four blocks of phase-error estimates (i.e., the previous 4×50=200 phase-error estimates) is computed.

If, in line 5, the difference between mean_now and mean_past2 is greater than a first phase-error difference threshold (e.g., π/4*1.1), indicating a upward jump is present, and mean_now is greater than a first phase-error value threshold (e.g., π/4*0.6), indicating that the phase error is relatively large, then cycle slip detection and removal block 110 determines that the current block n has jumped by +π/2 over the previous blocks. In this case, each phase-error estimate in the block n is adjusted by −π/2 in line 6, and cycle slip detection and removal block 110 outputs the adjusted phase-error estimates as phase-error estimates $\Delta\phi_4(t)$. Note that π/4 is the upper boundary of the phase-error estimates and the scaling factors of 1.1 and 0.6 may be adjusted to make cycle slip detection and removal block 110 more sensitive or less sensitive to jumps.

If, in line 8, the difference between mean_now and mean_past2 is less than a second phase-error difference threshold (e.g., −π/4*1.1), indicating a downward jump is present, and mean_now is less than a second phase-error value threshold (e.g., −π/4*0.6), indicating that the phase error is relatively large, then cycle slip detection and removal block 110 determines that the current block n has jumped by −π/2 over the previous blocks. In this case, each phase-error estimate in the block n is adjusted by +π/2 in line 9, and cycle slip detection and removal block 110 outputs the adjusted phase-error estimates as phase-error estimates $\Delta\phi_4(t)$. Note that −π/4 is the lower boundary of the phase-error estimates, and, as described above, the scaling factors of 1.1 and 0.6 may be adjusted to make cycle slip detection and removal block 110 more sensitive or less sensitive to jumps.

If the conditions in lines 5 and 8 are not met, then no jump is detected, and cycle slip detection and removal block 110 outputs non-adjusted phase-error estimates (i.e., phase-error estimates $\Delta\phi_3(t)$) as phase-error estimates $\Delta\phi_4(t)$.

Referring back to FIG. 1, phase compensator 112 receives the digital input signal $E_{in}$ and adjusts the phases of the complex symbols contained therein based on the phase-error estimates $\Delta\phi_4(t)$ to generate output signal $E_{out}$, where $E_{out}=E_{in}*\exp(-j\Delta\phi_4(0))$. Output signal $E_{out}$ is then provided to one or more downstream processor(s) 114, which perform forward-error correction and other suitable processing.

Figure 4:
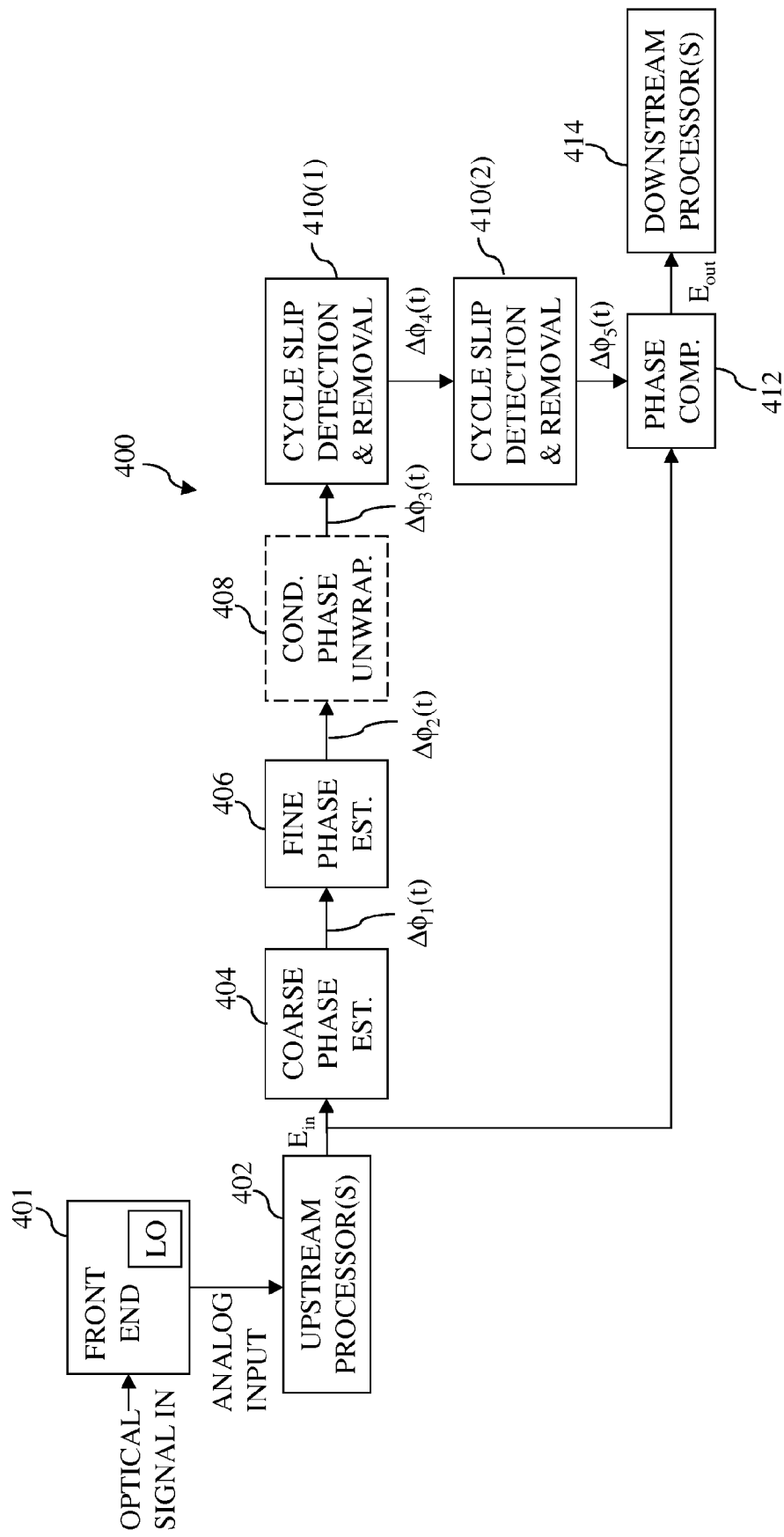
FIG. 4 shows a simplified block diagram of a receiver according to another embodiment of the disclosure that employs cyclic slip detection and removal.

FIG. 4 shows a simplified block diagram of a receiver 400 according to another embodiment of the disclosure that employs cyclic slip detection and removal. Receiver 400 has front end 401, one or more upstream processor(s) 402, coarse phase estimator 404, fine phase estimator 406, conditional phase unwrapping block 408 (optional), phase compensator 412, and one or more downstream processor(s) 414, which are similar to the analogous features in FIG. 1. In addition, receiver 400 has first and second cycle slip detection and removal blocks 410(1) and 410(2).

Cycle slip detection and removal blocks 410(1) and 410(2) may each implement code similar to that of Matlab code 300. However, cycle slip detection and removal block 410(1) may use block sizes that are different from those used by cycle slip detection and removal block 410(2). For example, in one embodiment, cycle slip detection and removal block 410(1) may implement a block size of 50 phase-error estimates, and each current block of 50 phase-error estimates may be compared to two previous blocks of phase-error estimates (e.g., 100 phase-error estimates total). This may help detect cycle slips that arise among the data symbols, possibly resolving cycle slips that were introduced or not resolved during fine phase-error estimation. In addition, cycle slip detection and removal block 410(2) may implement a block size of 100 phase-error estimates, and each current block of 100 phase-error estimates may be compared to four previous blocks of phase-error estimates (e.g., 400 phase-error estimates total). This may help detect cycle slips that arise from one set of 100 data symbols to the next, possibly resolving cycle slips that were introduced during coarse phase-error estimation.

In another embodiment, cycle slip detection and removal block 410(1) may use blocks that include only data symbols, while cycle slip detection and removal block 410(2) uses blocks that include only pilot symbols. For example, cycle slip detection and removal block 410(1) may compare each block of 50 phase-error estimates to four previous blocks of phase-error estimates (e.g., 200 phase-error estimates total), where each of the phase-error estimates is a phase-error estimate for a data symbol. This may help detect cycle slips that arise among the data symbols, possibly resolving cycle slips that were introduced or not resolved during fine phase-error estimation. In addition, cycle slip detection and removal block 410(2) may compare each block of five phase-error estimates to four previous blocks of phase-error estimates (e.g., 20 phase-error estimates total), where each of the phase-error estimates is a phase-error estimate for a pilot symbol. This may help detect cycle slips that arise among the pilot symbols, possibly resolving cycle slips that were introduced or not resolved during coarse phase-error estimation.

Figure 5:
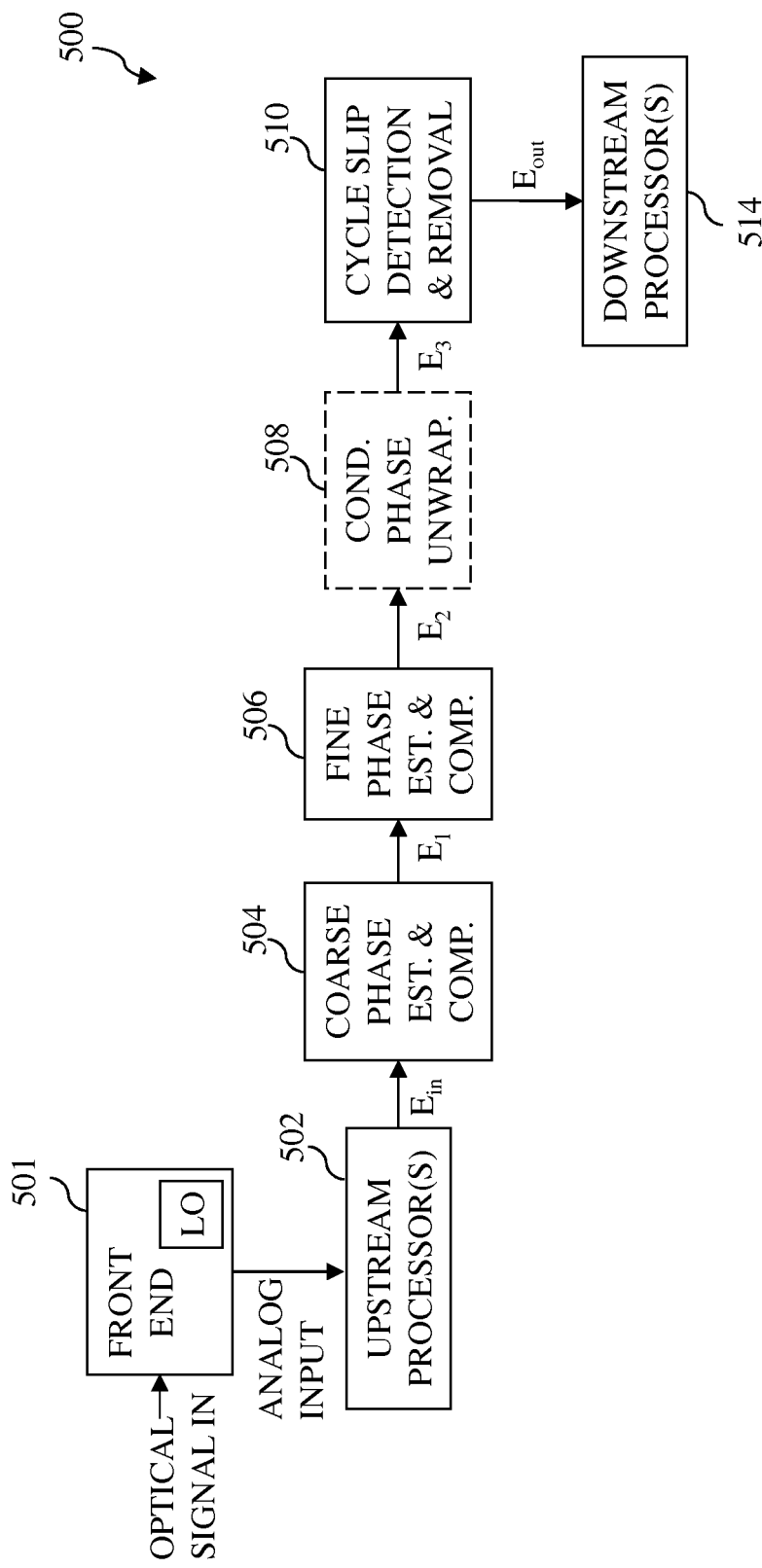
FIG. 5 shows a simplified block diagram of a receiver according to yet another embodiment of the disclosure that employs cyclic slip detection and removal.

FIG. 5 shows a simplified block diagram of a receiver 500 according to yet another embodiment of the disclosure that employs cyclic slip detection and removal. Receiver 500 operates in a manner similar to that of receiver 100 of FIG. 1. However, rather than compensating digital input signal $E_{in}$ using a single phase compensator (e.g., 112), digital input signal $E_{in}$ is compensated as each of coarse phase estimation, fine phase estimation, conditional phase unwrapping (optional), and cycle slip detection and removal are performed.

Thus, receiver 500 comprises coarse phase estimator and compensator 504, which (i) performs coarse phase-error estimation in a manner similar to coarse phase estimator 104 and (ii) compensates digital input signal $E_{in}$ based on the resulting coarse phase-error estimates to generate adjusted input signal $E_1$. Fine phase estimator and compensator 506 performs fine phase-error estimation on adjusted input signal $E_1$ in a manner similar to fine phase estimator 106, and compensates adjusted input signal $E_1$ based on the resulting fine phase-error estimates to generate further-adjusted input signal $E_2$.

Conditional phase unwrapping block 508 (optional) extracts phase-error estimates from the further-adjusted input signal $E_2$, performs conditional phase unwrapping on the resulting phase-error estimates in a manner similar to conditional phase unwrapping block 108, and compensates further-adjusted input signal $E_2$ to generate yet further-adjusted input signal $E_3$. Cycle slip detection and removal block 510 extracts phase-error estimates from yet further-adjusted input signal $E_3$, performs cycle slip detection and removal in a manner similar to that described above in relation to cycle slip detection and removal block 110, and compensates yet further-adjusted input signal $E_3$ to generate output signal $E_{out}$.

Although not shown, receiver 500 may also be implemented with two cycle slip detection and removal blocks that operate in manners similar to those described above in relation to cycle slip detection and removal blocks 410(1) and 410(2) of FIG. 4, except that each of the two cycle slip detection and removal blocks would also adjust the digital input signal and provide an adjusted input signal to the next block.

Alternative embodiments of the disclosure may be implemented with more than two cycle slip detection and removal blocks. In such embodiments, the cycle slip detection and removal blocks may each use a different block size. Furthermore, alternative embodiments may be implemented in which block 504 performs phase compensation, but the phase compensations for blocks 506, 508, and 510 are performed together analogous to phase compensation block 112 of FIG. 1. Similarly, in other embodiments, blocks 504 and 506 may each perform their own phase compensation, but the phase compensations for blocks 508 and 510 are performed together.

As would be apparent to one skilled in the art, one or both of (i) conditional phase unwrapping and (ii) cycle slip detection and removal may be implemented as processing blocks in a software program. Such software may be employed in, for example, a digital signal processor, micro-controller, or general-purpose computer. Further, as would be apparent to one skilled in the art, one or both of (i) conditional phase unwrapping and (ii) cycle slip detection and removal may be implemented as circuit-based processes, including possible implementation as a single integrated circuit (such as an ASIC or an FPGA), a multi-chip module, a single card, or a multi-card circuit pack.

Although embodiments of the disclosure were described as implementing both coarse phase-error estimation and fine phase-error estimation, embodiments of the disclosure are not so limited. Alternative embodiments of the disclosure may implement only one of coarse phase-error estimation and fine phase-error estimation.

Alternative embodiments of the disclosure may be implemented using an unconditional phase-unwrapping block that unwraps the phases of the received complex symbols without any conditions.

Embodiments of the disclosure can be embodied in the form of methods and apparatuses for practicing those methods. The embodiments can also be in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the embodiment. The embodiments can also be in the form of program code, for example, stored in a non-transitory machine-readable storage medium including being loaded into and/or executed by a machine, wherein, when the program code is loaded into and executed by a machine, such as a computer, the machine becomes an apparatus for practicing the embodiment. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of the embodiments of the disclosure may be made by those skilled in the art without departing from the scope of the invention(s) as expressed in the following claims. For example, in line 5 of Matlab code 300 in FIG. 3, rather than comparing a difference of mean_now and mean_past to a threshold, mean_now could be compared to a sum of $\pi/4*1.1$ and mean_past. As another example, embodiments of the disclosure may be employed with a modulation scheme that does not use quadrants (e.g., BPSK). In the case of BPSK, the phase-error after the fine phase estimation would be wrapped between $-\pi$ and $\pi$, rather than between $-\pi/2$ and $\pi/2$.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the methods set forth herein are not necessarily required to be performed in the order described, and the order of the steps of such methods should be understood to be merely examples. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A method comprising:
    (a) receiving, at an optical receiver, a signal comprising a plurality of phase-modulated symbols;
    (b) generating, for each phase-modulated symbol, a phase-error estimate of a phase error of the phase-modulated symbol;
    (c) detecting presence of a cycle slip based on the phase-error estimates; and
    (d) adjusting a phase of each of one or more of the received phase-modulated symbols, downstream of a local oscillator of the receiver, to remove the detected cycle slip without adjusting the local oscillator; and
    wherein, in step (c), the cycle slip is detected by comparing a current block of the phase-error estimates to one or more previous blocks of the phase-error estimates.

2. The method of claim 1, wherein step (b) comprises generating each phase-error estimate by performing at least fine-phase estimation.

3. The method of claim 2, wherein step (b) comprises performing both (i) pilot-aided coarse-phase estimation and (ii) the fine-phase estimation.

4. The method of claim 1, wherein step (b) comprises:
    (b1) performing, for each phase-modulated symbol, at least one of (i) coarse phase estimation to generate a coarse phase-error estimate and (ii) fine phase estimation to generate a fine phase-error estimate;
    (b2) adjusting, for each of one or more of the phase-modulated symbols, the phase of the phase-modulated symbol based on at least one of (i) the coarse phase-error estimate and (ii) the fine phase-error estimate; and
    (b3) generating, for each phase-modulated symbol, the phase-error estimate of the phase error of the phase-modulated symbol after the phase-modulated symbol is adjusted in step (b2).

5. The method of claim 1, wherein step (c) comprises:
    (c1) generating a current mean phase-error estimate of the current block of the phase-error estimates;
    (c2) generating a previous mean phase-error estimate of the one or more previous blocks of the phase-error estimates; and
    (c3) comparing the current mean phase-error estimate to the previous mean phase-error estimate to detect the cycle slip.

6. The method of claim 5, wherein step (c3) comprises:
    (c3i) comparing (i) a difference between the current mean phase-error estimate and the previous mean phase-error estimate to (ii) a first threshold;
    (c3ii) comparing the current mean phase-error estimate to a second threshold; and
    (c3iii) detecting the cycle slip based on the comparisons of (c3i) and (c3ii).

7. The method of claim 1, wherein step (c) comprises:
    (c1) comparing a first current block of the phase-error estimates to a first set of one or more previous blocks of the phase-error estimates to detect the cycle slip, wherein the first current block and each block in the first set has a first number of phase-modulated symbols; and
    (c2) comparing a second current block of the phase-error estimates to a second set of one or more previous blocks of the phase-error estimates to detect the cycle slip, wherein the second block and each block in the second set has a second number of phase-modulated symbols, different from the first number of phase-modulated symbols.

8. The method of claim 1, wherein step (c) comprises:
    (c1) comparing a first current block of the phase-error estimates to a first set of one or more previous blocks of the phase-error estimates to detect the cycle slip, wherein the first current block and each block in the first set consist of phase-modulated symbols corresponding to data; and
    (c2) comparing a second current block of the phase-error estimates to a second set of one or more previous blocks of the phase-error estimates to detect the cycle slip, wherein the second block and each block in the second set consist of phase-modulated symbols corresponding to pilot information.

9. The method of claim 1, wherein:
    the phase-error estimates in step (b) are wrapped phase-error estimates;
    step (b) comprises unwrapping the wrapped phase-error estimates to generate unwrapped phase-error estimates; and
    step (c) comprises detecting the presence of the cycle slip based on the unwrapped phase-error estimates.

10. A method comprising:
    configuring a digital signal processor of an optical receiver to generate, for each phase-modulated symbol carried by an optical signal received by the optical receiver, a phase-error estimate of a phase error of the phase-modulated symbol;
    configuring the digital signal processor to detect presence of a cycle slip by comparing a current block of the phase-error estimates to one or more previous blocks of the phase-error estimates; and
    configuring the digital signal processor to adjust a phase of each of one or more of received phase-modulated symbols, downstream of a local oscillator of the optical receiver, to remove a detected cycle slip without causing an adjustment of the local oscillator.

11. An apparatus comprising:
- a phase-error estimator configured to generate a phase-error estimate of a phase error of each phase-modulated symbol of a plurality of phase-modulated symbols of a received optical signal;
- a cycle slip detector configured to detect presence of a cycle slip based on the phase-error estimates; and
- a cycle slip remover configured to adjust, downstream of a local oscillator of a receiver, a phase of each of one or more of the received phase-modulated symbols to remove the detected cycle slip without adjusting the local oscillator; and
- wherein the cycle slip detector is configured to detect the cycle slip by comparing a current block of the phase-error estimates to one or more previous blocks of the phase-error estimates.

12. The apparatus of claim 11, wherein the phase-error estimator comprises at least a fine-phase estimator configured to generate each of the phase-error estimates.

13. The apparatus of claim 12, wherein the phase-error estimator comprises both (i) a coarse-phase estimator and (ii) the fine-phase estimator.

14. The apparatus of claim 11, the cycle slip detector is configured to:
- generate a current mean phase-error estimate of the current block of the phase-error estimates;
- generate a previous mean phase-error estimate of the one or more previous blocks of the phase-error estimates; and
- comparing the current mean phase-error estimate to the previous mean phase-error estimate to detect the cycle slip.

15. The apparatus of claim 14, wherein the cycle slip detector is configured to:
- (a) compare (i) a difference between the current mean phase-error estimate and the previous mean phase-error estimate to (ii) a first threshold;
- (b) compare the current mean phase-error estimate to a second threshold; and
- detect the cycle slip based on the comparisons of (a) and (b).

16. The apparatus of claim 11, wherein the cycle slip detector is configured to:
- compare a first current block of the phase-error estimates to a first set of one or more previous blocks of the phase-error estimates to detect the cycle slip, wherein the first current block and each block in the first set has a first number of phase-modulated symbols; and
- compare a second current block of the phase-error estimates to a second set of one or more previous blocks of the phase-error estimates to detect the cycle slip, wherein the second block and each block in the second set has a second number of phase-modulated symbols, different from the first number of phase-modulated symbols.

17. The apparatus of claim 11, wherein the cycle slip detector is configured to:
- compare a first current block of the phase-error estimates to a first set of one or more previous blocks of the phase-error estimates to detect the cycle slip, wherein the first current block and each block in the first set consist of phase-modulated symbols corresponding to data; and
- compare a second current block of the phase-error estimates to a second set of one or more previous blocks of the phase-error estimates to detect the cycle slip, wherein the second block and each block in the second set consist of phase-modulated symbols corresponding to pilot information.

18. The apparatus of claim 11, wherein:
- the phase-error estimates generated by the phase-error estimator are wrapped phase-error estimates;
- the apparatus further comprises an unwrapping block configured to unwrap the wrapped phase-error estimates to generate unwrapped phase-error estimates; and
- the cycle slip detector is configured to detect the presence of the cycle slip based on the unwrapped phase-error estimates.

19. The apparatus of claim 11, wherein:
- the apparatus comprises at least one of:
  - (1) a coarse phase estimator and compensator configured to (i) generate, for each phase-modulated symbol, a coarse phase-error estimate and (ii) adjust, for each of one or more of the phase-modulated symbols, the phase of the phase-modulated symbol based on the coarse phase-error estimate; and
  - (2) a fine phase estimator and compensator configured to (i) generate, for each phase-modulated symbol, a fine phase-error estimate and (ii) adjust, for each of one or more of the phase-modulated symbols, the phase of the phase-modulated symbol based on the fine phase-error estimate; and
- the phase-error estimator is configured to generate, for each phase-modulated symbol, the phase-error estimate of the phase error of the phase-modulated symbol after the phase-modulated symbol is adjusted by at least one of (a) the coarse phase estimator and compensator and (b) the fine phase estimator and compensator.

20. The apparatus of claim 11, further comprising a digital signal processor configured to implement the phase-error estimator, the cycle slip detector and the cycle slip remover.

21. The apparatus of claim 11, further comprising a coherent optical receiver configured to recover the plurality of phase-modulated symbols from the received optical signal.

* * * * *